Feb. 25, 1964  H. G. STENGER ETAL  3,122,596
METHOD OF AND APPARATUS FOR PRODUCING PLASTIC CONTAINERS
Filed Aug. 4, 1961
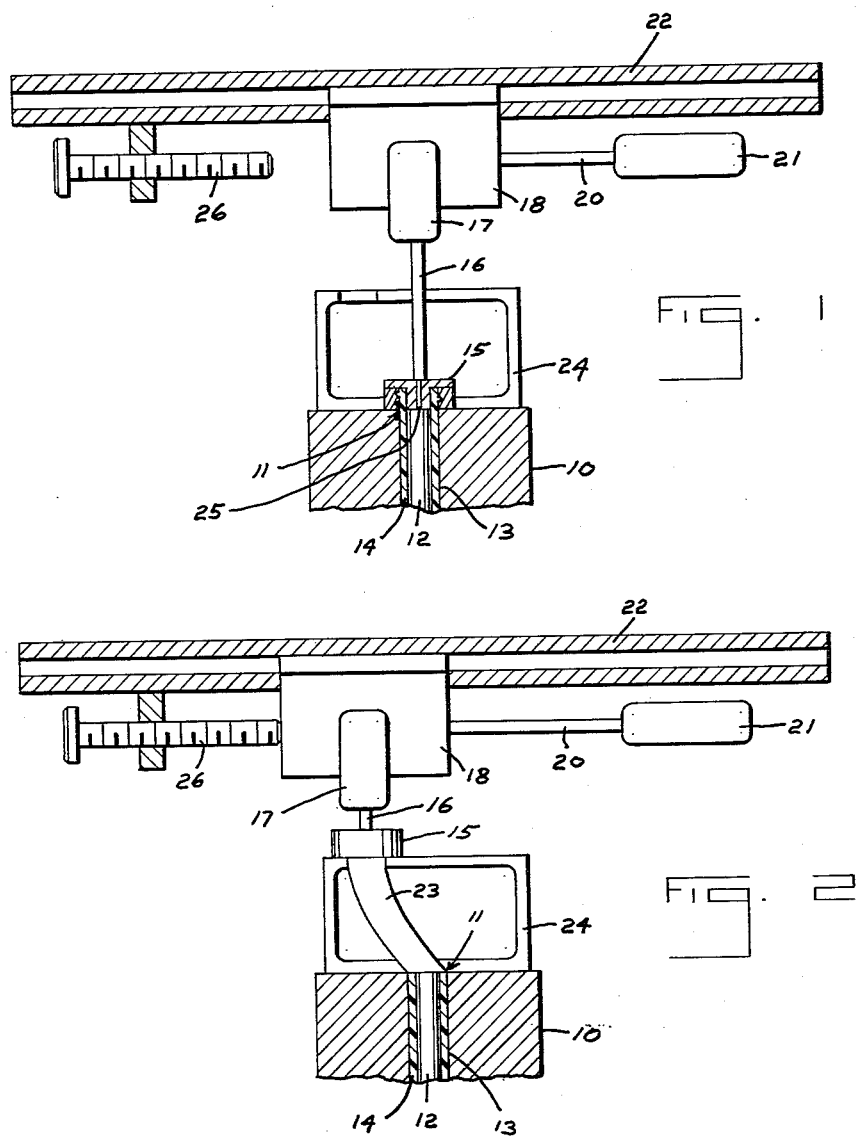
INVENTORS
HANS G. STENGER
ALBERT R. UHLIG
BY
SPENCER L. BLAYLOCK, JR.
& W. A. SCHAICH
ATTORNEYS 3,122,596
METHOD OF AND APPARATUS FOR PRODUCING PLASTIC CONTAINERS
Hans G. Stenger, Lambertville, Mich., and Albert R. Uhlig, Toledo, Ohio, assignors to Owens-Illinois Glass Company, a corporation of Ohio
Filed Aug. 4, 1961, Ser. No. 129,459
2 Claims. (Cl. 264—98)

This invention relates generally to a method and apparatus for producing plastic containers such as bottles, and more particularly to a method and apparatus for manufacturing blown plastic containers, wherein the neck portion is offset axially relative to the body.

An important object of our invention is the provision of a simple, yet effective, method and apparatus, through the utilization of which bottles with axially offset necks or finishes may be produced rapidly.

A further object of this invention is the provision of a novel and simple form of laterally movable neck mold and carrier therefor.

These and other objects will become apparent from a reading of the following detailed description of this invention taken in conjunction with the drawing in which:

FIGURE 1 is a vertical sectional view with parts in elevation showing the laterally movable neck mold, its holder, etc. and a blow mold in their initial operating position.

FIGURE 2 is a view similar to FIGURE 1 but with the neck mold and parison of thermoplastic material moved to their position preparatory to the introduction of blown air into the parison.

In brief, this invention contemplates positioning an elongated hollow thermoplastic tube, or parison, in a blow mold with at least a major portion of its axis inclined to the axis of the blow mold. Thereafter the parison is expanded to its final shape in the mold. In addition, this invention contemplates apparatus in which the neck mold is movable laterally to shift its position following extrusion of the parison to position the latter inclined just prior to closing of a blow mold about the parison.

In the illustrated embodiment of my invention it comprises a die head 10 provided with an annular orifice 11, such being defined at its inner wall by a mandrel 12, and at its outer wall by the die head 10. This mandrel 12 is separably connected at its base to a portion of the die head (not shown). The mandrel 12 is positioned in a passageway 13 which extends upwardly through the die head 10. Between the wall of this passageway 13 and the mandrel, thermoplastic material 14, such as polyethylene flows in tubular form to the orifice 11 from an extruder or other plasticizer (not shown).

Above the die head 10 is a conventional neck mold 15 which is movable vertically by rod 16 which is connected to a conventional air or hydraulic cylinder 17 so that in its lowermost position it contacts the die head in register with the orifice 11. The hydraulic or air cylinder 17 is mounted for lateral movement on a support 18 which is movable by a connecting rod 20 which is connected to another air or hydraulic cylinder 21. The support 18 moves laterally on a bracket 22. Any suitable apparatus may be utilized to accomplish the desired movement of the neck mold 15 and cylinder 18.

In the lowermost position of the neck mold, the thermoplastic molding material 14 is injected into the neck mold, thus immediately and finally shaping the neck of a container. This also anchors the neck to the mold. With upward movement of the neck mold and concurrent extrusion of the thermoplastic material 14 from the orifice, a tube or parison 23 is produced, such at this stage extending in a vertical direction. As is customary, upward travel of the neck mold 15 is terminated at a predetermined point preparatory to closing of a partible blow mold about the tube or parison 23. In the drawing only one half 24 of the blow mold is illustrated.

Before the blow mold closes, the neck mold 15 is shifted to the position shown in FIGURE 2. Such movement places the tube or parison as in FIGURE 2 with its axis inclined and its lower end ready to be pinched between meeting knife edges (not shown) of the blow mold halves 24 when the same are closed about the parison. The upper, neck carrying end, at this stage, is anchored in the neck mold 15 which contacts the upper side of the blow mold.

If desired the lateral movement of the neck mold may be started before it has reached its upward position. Such can be accomplished by suitable activation of cylinder 21 which with cylinder 17 may be controlled by conventional circuitry (not shown).

Upon closing of the blow mold and resultant sealing of the bottom end of the tube or parison 23, air under pressure may be introduced through the neck mold via air channel 25 to expand the tube to the final shape of the bottle being produced. With removal of the blown bottle from the mold, the flash or tail is removed from the bottom.

The neck or finish on the body of the container may be at any lateral position relative to the axis of the bottle. This may be accomplished by any suitable stop means such as rod 26. The rod 26 is movable as by screw threads to any desired position to operate as a stop for the support 18 of the neck mold, thereby determining and limiting the extent of the lateral movement of the neck mold.

It will be apparent from a reading of the foregoing that various modifications may be made within the spirit and scope of the following claims.

We claim:
1. In the method of producing a bottle having a body and an axially offset neck consisting in forming an elongated hollow thermoplastic tube by anchoring a neck mold to virgin thermoplastic material in a discharge orifice, moving the neck mold axially away from the orifice to a fixed position and concurrently therewith extruding material from the orifice thereby to form a tube thereafter, shifting the neck mold laterally relative to the orifice thereby to position the longitudinal axis of a major part of the tube at an angle to the orifice axis, closing a blow mold about the tube and expanding the tube to the final shape of the bottle.

2. In apparatus for producing a bottle having a body and an axially offset neck, an annular orifice through which a thermoplastic tube may be extruded, a neck mold positionable in register with the annular orifice and movable axially away from the latter with a length of tube anchored to both the orifice and neck mold, means for thereafter effecting lateral movement of the neck mold and with it the adjacent end of the tube whereby to position the latter with a major portion of its axis inclined to the orifice axis, and a blow mold closable about the tube.

References Cited in the file of this patent

UNITED STATES PATENTS

| 2,936,481 | Wilkalis et al. | May 17, 1960 |
| 3,000,051 | Schaich | Sept. 19, 1961 |

FOREIGN PATENTS

| 1,169,230 | France | Dec. 24, 1958 |